United States Patent [19]
Hurst

[11] Patent Number: 5,762,245
[45] Date of Patent: Jun. 9, 1998

[54] TRUNK TRAY

[76] Inventor: Andrew Hurst, 6324 Midsummer La., Roanoke, Va. 24018

[21] Appl. No.: 746,039

[22] Filed: Nov. 6, 1996

[51] Int. Cl.$^6$ ........................................... B60R 7/00
[52] U.S. Cl. .................. 224/311; 224/314; 224/321; 224/282; 108/44; 296/37.1
[58] Field of Search ................... 224/275, 282, 224/311, 314, 321; 211/88; 206/549; 108/44, 45, 34, 35, 106, 144, 146; 296/37.1

[56] References Cited

U.S. PATENT DOCUMENTS

| | | | |
|---|---|---|---|
| 3,828,994 | 8/1974 | Hollins | 224/275 |
| 4,466,659 | 8/1984 | Carpentier et al. | 224/275 |
| 5,046,433 | 9/1991 | Kramer et al. | 108/44 |
| 5,060,581 | 10/1991 | Malinski | 108/44 |
| 5,480,058 | 1/1996 | Hutchins | 224/282 |

*Primary Examiner*—Henry J. Recla
*Assistant Examiner*—Timothy L. Maust
*Attorney, Agent, or Firm*—Woods, Rogers & Hazlegrove; C. Fred Rosenbaum

[57] ABSTRACT

An automobile accessory to be attached to the inside of the trunk lid. When the trunk lid is open, it provides a horizontal shelf in its operative position. The horizontal shelf provides space and support for various items, such as food and beverages. The device has two planar elements hingedly attached to each other along one edge, respectively. The two opposite edges of the planar elements are attached to each other by flexible adjustable straps. One planar element is fabricated with a uniform pattern of aperatures to cooperate with the trunk lid structure and provide different attachment points necessary for different automobiles. Fasteners, extending through the selected aperatures, are attached to the appropriate points on the inside of the trunk lid by bracket, magnet or otherwise adhered thereto, affixing the planar element to the trunk lid. The length of the straps is adjusted to compensate for the angle of the opened trunk lid by which the other planar element pivots into and is held as a horizontal shelf.

5 Claims, 1 Drawing Sheet

TRUNK TRAY

BACKGROUND OF THE INVENTION

The automobile serves many purposes in addition to basic transportation. There are some activities for which the auto is used that require some minor modification. For example, when the auto is used for recreational purposes, such as picnics and sporting events, it not only takes the people to the event but becomes a mobile kitchen and/or dining place. The term, "tailgating", describes the activity but, unfortunately, only includes those vehicles that have a horizontal rear appendage. The standard automobile trunk provides plenty of space for carrying various foods and beverages but is usually not very well suited for presentation or serving of the vituals.

It is an object of this invention to provide an accessory that can provide an easily accessible serving tray. When the automobile trunk is used as a serving table, the food and beverages are located at a height approximating the knee level of someone standing beside the automobile. Sitting on the floor of the trunk, the food and beverages are surrounded by the upstanding walls formed by the rear fenders and bumper of the car. To reach the vituals, one has to assume an awkward position of bending from the waist and extending themselves into the interior of the trunk. There is a great opportunity for spills and other accidents while transitioning through these contortions while carrying full plates and glasses. The serving tray of this invention, in its operative position, places the vituals on an open sided flat surface at a height approximating chest level of the person standing beside the automobile. The upper face of the tray has a non-skid surface which may be made of a foam or rubberized material. The material may carry various logos and colors, such as corporate, college or auto marques.

It is an object of this invention to provide an accessory that can be easily and rapidly attached to any car temporarily. The serving tray can be put in place in the car only for those occasions when vituals are to be served from the car. The mounting structure of the serving tray provides the flexibility to cooperate with the interior structure of the trunk lid of a large variety of automobiles. The mounting of the tray does not require any structural modification of the trunk lid of the automobile. The attachment to the trunk lid is through brackets or fittings that use existing trunk lid structure or magnets or other adherent structures, such as Velcro (Velcro is the trademark for a flexible fastener made of two parts, one part having a multiplicity of filamentary loops and the other part having a multiplicity of filamentary hooks that engage each other when pressed together.) or polymeric glues.

When in the car, mounted on the interior of the trunk lid in the traveling position, the server accessory that does not significantly intrude into the cargo space of the trunk. The serving tray is connected to the support plate by a hinge structure. The hinge allows the support plate and the tray to be folded together into parallel relationship. The folded elements are held in this parallel relationship by a cooperating fastener. When the support plate and serving tray are mounted in the trunk in the traveling position, the space occupied by the accessory amounts to the thickness of the plate and tray.

It is an object of the invention to provide the serving tray with a horizontal surface when in the operative position. Due to overall design considerations, various automobiles have trunk lids that travel through different arcs from the closed position to the open position. This results in differing angular relations from the vertical, when the trunk lids are in the open position. To compensate for these different angles and provide a horizontal surface in the serving tray, adjustable support straps connect the free edge of the serving tray and the support plate. Once the trunk lid is open, the serving tray is pivoted from its traveling position to the operative position and the adjustable straps are set to the appropriate length to provide a level serving tray. The adjustable straps may be continuous with sliding friction clips or discontinous with cooperating multiple pegs and aperatures or Velcro elements thereon.

U.S. Pat. Nos. 5,310,103; 3,473,680; and 3,318,471 are directed to a shelf attached to the interior of a vehicle trunk lid. While there are general similiarities to the instant invention, these patents do not address the problems of providing a universal attachment structure suitable for application to many different automobiles produced by different manufacturers.

DETAILED DESCRIPTION OF THE DRAWINGS

Figure 1:
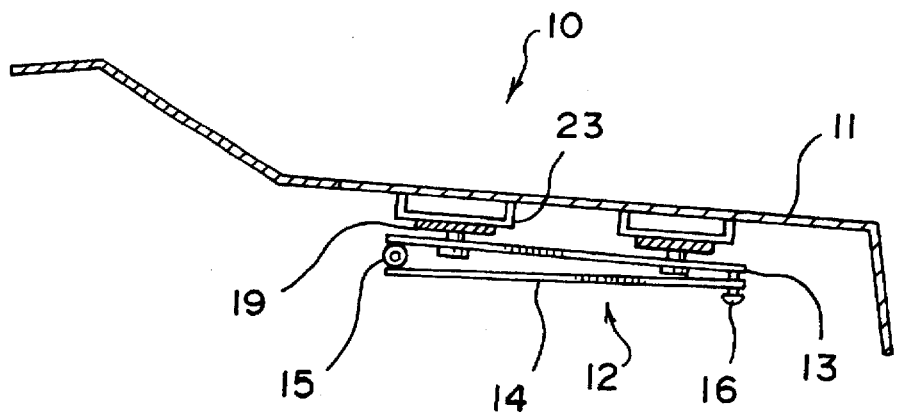
FIG. 1 shows a cross section of the rear portion of an automobile with the server tray in the traveling position.

In FIG. 1, the rear portion of an automobile 10 from the rear window to the rear bumper is illustrated. The trunk lid 11 is closed and the traveling tray 12 is shown in the stowed position. The support plate 13 and the serving tray 14 are stowed in parallel relationship through the action of the hinge 15 which connects the plate and tray together along one side of each, respectively. The traveling tray is maintained in the stowed position by the cooperating fastener 16. The stowed position permits the traveling tray to be temporarily installed at home, using whatever tools are necessary, without taking up too much space in the closed trunk. The traveling tray is then ready to be deployed by merely unclipping the fastener 16 upon arrival at the place of use.

Figure 2:
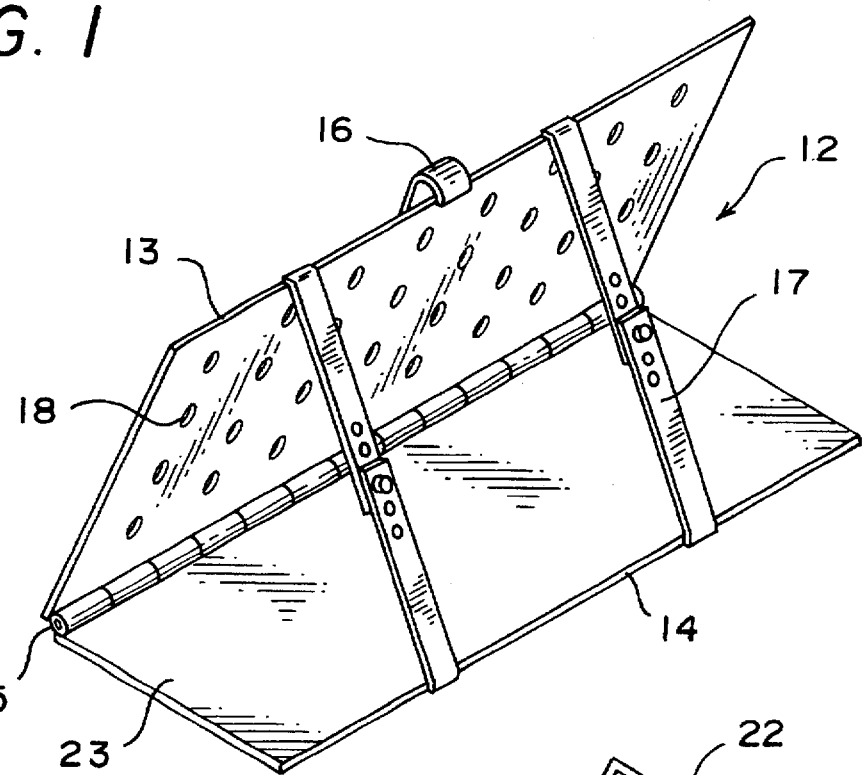
FIG. 2 shows a plan view of the traveling tray.

In FIG. 2, the traveling tray 12 is shown in the operative position. The support plate is made of a thin plastic, metal or fiberboard material of such dimensions to cover the area of the interior trunk lid between the forward edge of the trunk lid and the lip of the trunk lid without interfering with the operation of the trunk lid. The material may be rigid or slightly flexible to better conform with the interior shape of the trunk lid. The support plate may be made in several different sizes to accommodate different vehicles. The approximate dimensions of a typical support plate are 8 to 12 inches wide and 18 to 36 inches long. The long dimension is disposed transverse to the longitudinal axis of the vehicle.

The support plate 13 has a plurality of apertures 18 therethrough in a uniform pattern. These apertures 18 allow fasteners to be inserted through the support plate 13 in a variety of locations corresponding to the particular construction of different vehicles. To mount the traveling tray in a particular automobile, the support plate is compared to the interior construction of a trunk lid and the apertures are selected through which the fasteners are to be inserted. Clearly, the more supporting points possible, the stronger the mount will be. The apertures selected are those that provide the closest proximity to the interior surface of the trunk lid.

The serving tray 14 is of comparable size to the support plate. It may be made of the same or similar material as the support plate. The material must support, without deformation, the items usually placed on a small serving tray. The upper surface 23 of the serving tray is made to be non-skid. This may be accomplished by using a layer of a foam or rubberized material. The surface may also be roughened. The serving tray 14 is attached to the support plate 13 through a hinge 15. As shown in FIG. 2, the hinge is continuous across the length of the elements. However, the hinge could be made as a plurality of independent hinges. The hinge is capable of rotation through an arc of 180 degrees.

Two straps 17 are located toward the ends of the support plate 13 and serving tray 14. The straps are connected, at one end, to the support plate and extend from the upper edge of the support plate to the serving tray at the other end. These straps 17 support the serving tray during use. The straps are adjustable to permit leveling of the serving tray. The adjustment may be accomplished through a conventional sliding clamp or the straps may be of two piece segments with cooperating fasteners on each segment,e.g. snaps, buckles, or Velcro. One strap could be used in place of the structure shown. In this case, the single strap would be disposed in the center of the free edge of the serving tray.

Figure 3:
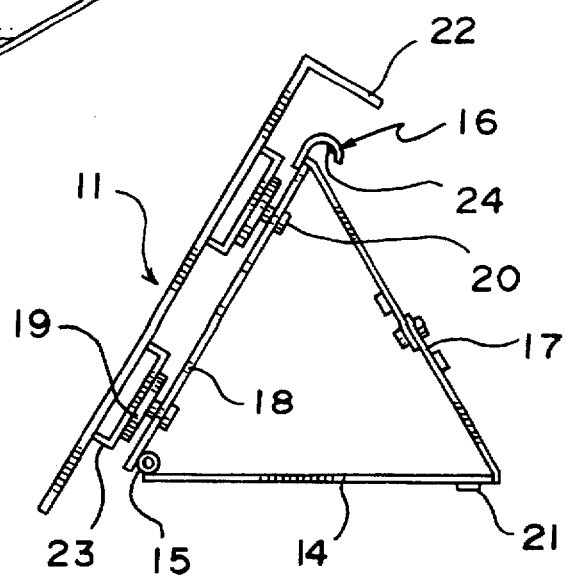
FIG. 3 shows a cross section of the rear portion of an automobile with the server tray in the operative position..

The support plate and the serving tray may be held in parallel during transport by the flexible fastening strap 16 which carries a fastener element which cooperates with a fastener element on the serving tray,e.g. a snap, hook and eye, or Velcro. In FIG. 3, the cooperating elements of the fastener are illustrated as a snap 21 and 24.

In FIG. 3, the trunk lid 11 is open and the traveling tray is in the operative position. The trunk tray is suitably spaced from the trunk lid lip 22. The reinforcing elements 23 of the trunk lid are in close proximity with the support plate 13. A fastener 20 is placed over an aperture 18 closest the reinforcing member. In this embodiment, the fastener 20 is shown as a nut screwed onto a bolt extending from a magnet 19 through an aperture 18. The magnet 19 is attached to the reinforcing member 23. In the alternative, the magnet may be in the form of a nut and the fastener a bolt passing through aperture 18 into the magnet. In other makes of automobiles, the reinforcing members in the trunk have apertures formed therein. With these cars, the fastener takes the form of a bracket or hanger inserted into the aperture of the trunk lid and extending through an aperture 18 in the support plate. For automobiles with carpeted trunk lids the magnet may be used or the traveling tray may be mounted with fasteners extending through the fabric and connected to the reinforcing members.

I claim:

1. A trunk tray adapted to be mounted on the interior surface of a trunk lid of any automobile to provide a level surface from which to serve victuals when said trunk lid is open, said trunk tray comprising a support plate having a connecting means for mounting said trunk tray, said connecting means formed as a plurality of apertures in a uniform pattern throughout said support plate, said plurality of apertures adapted to provide a plurality of connecting points with any automobile trunk lid, a generally planar serving tray adapted to present said victuals, a hinge means connected to said support plate and to said serving tray to provide arcuate movement of said serving tray about said support plate, and a leveling strap means connected to said support plate and said serving tray adjustable to maintain said serving tray in a level attitude.

2. A trunk tray of claim 1, wherein said serving tray is adapted to be in superposed parallel relationship to said support plate when said trunk lid is closed, and openable fastener mounted on said support plate is connected to said serving tray and holds said support plate and said serving tray in superposed parallel relationship.

3. A trunk tray of claim 2, wherein in said superposed parallel relationship said serving tray has a surface adjacent said support plate, said surface is a non-skid surface.

4. A trunk tray comprising a support plate having a connecting means for mounting the trunk tray in an automobile trunk on the trunk lid thereof, said connecting means formed as a plurality of apertures in a uniform pattern through said support plate, certain of said apertures in said connecting means receiving brackets attached to said trunk lid, said support plate having an edge, a serving tray having a planar non-skid surface facing said support plate, said serving tray having an edge, a hinge means connected to said edge of said support plate and said edge of said serving tray allowing arcuate movement of said serving tray about said support plate, leveling strap means connected to said support plate and said serving tray for maintaining said serving tray in a level attitude when said trunk lid is open.

5. A trunk tray of claim 4, wherein said support plate carries a latch means for holding said support plate and said serving tray in a superposed parallel position when said trunk lid is closed.

* * * * *